United States Patent [19]
Skinner

[11] Patent Number: 5,798,801
[45] Date of Patent: Aug. 25, 1998

[54] ARRANGEMENT FOR PROVIDING VIVID COLOR IN A TELEVISION SIGNAL

[75] Inventor: Kenneth R. Skinner, Ossining, N.Y.

[73] Assignee: U.S. Philips Corporation, New York, N.Y.

[21] Appl. No.: 646,665

[22] Filed: May 8, 1996

[51] Int. Cl.⁶ .................................................. H04N 9/64
[52] U.S. Cl. ........................ 348/645; 348/652; 348/649
[58] Field of Search ........................ 348/652, 645, 348/649, 646, 647, 648, 653, 654, 655, 656; H04N 9/73, 9/64

[56] References Cited

U.S. PATENT DOCUMENTS

| | | | |
|---|---|---|---|
| 3,864,723 | 2/1975 | Carpenter | 358/28 |
| 4,551,749 | 11/1985 | Narita | 348/649 |
| 4,633,299 | 12/1986 | Tanaka | 348/649 |
| 5,381,185 | 1/1995 | Ohki et al. | 348/652 |
| 5,555,031 | 9/1996 | Van Rooij | 348/652 |

FOREIGN PATENT DOCUMENTS

0620692A1  10/1994  European Pat. Off. ......... H04N 9/64

*Primary Examiner*—Amelia Ali
*Attorney, Agent, or Firm*—Edward W. Goodman

[57] ABSTRACT

An arrangement for increasing saturation of colors in a color television signal while maintaining fleshtone colors at a same level, the arrangement including a circuit for detecting color signals in a color television signal, circuitry for discerning fleshtone color signals in the detected color signals, a circuit for measuring signal levels of the detected color signals other than the discerned fleshtone color signals, and a circuit for increasing the signal levels of the detected color signals other than the discerned fleshtone color signals in dependence on at least one of the measured signal levels.

20 Claims, 12 Drawing Sheets

5,798,801

1

ARRANGEMENT FOR PROVIDING VIVID COLOR IN A TELEVISION SIGNAL

BACKGROUND OF THE INVENTION

1. Field of the Invention

The subject invention relates to the rendition of color pictures in a color television receiver.

2. Description of the Related Art

In the development of color television, a goal has been to provide a true representation of the colors in a color scene. However, it has been found that, in actuality, users of color television receivers prefer "better than life colors". This may be interpreted to mean higher saturated colors, with the exception of fleshtones.

This phenomenon of users preferring un-natural representations in the display of a television receiver is exemplified in U.S. patent application Ser. No. 08/263,699, filed Jun. 22, 1994, by Applicant, which discloses an arrangement for producing a television image displaying "whiter-than-white" colors, in which the white color temperature in the areas of the color white is raised to a higher than normal level, while the white color temperature in all other areas is kept at the normal level.

SUMMARY OF THE INVENTION

It is an object of the present invention to provide an arrangement for achieving vivid colors in a color television display without over saturating fleshtones.

This object is achieved in an arrangement for increasing saturation of colors in a color television signal while maintaining fleshtone colors at a same level, said arrangement comprising means for detecting color signals in a color television signal; means for discerning fleshtone color signals in said detected color signals; means for measuring signal levels of said detected color signals other than said discerned fleshtone color signals; and means for increasing the signal levels of said detected color signals other than said discerned fleshtone color signals in dependence on at least one of said measured signal levels.

Applicant has found that in a television receiver, this can be accomplished in any one of three separate places in the signal path, i.e., at the output of the tuner on the chrominance signal, at the output of the color decoder on the color difference signals, or at the output of the matrix circuit on the color (RGB) signals.

Hence, a first aspect of the invention includes an arrangement for increasing saturation of colors in a color television signal while maintaining the fleshtone colors at a same level, said arrangement comprising means for receiving a chroma signal; an envelope detector coupled to said receiving means for detecting signal levels outside a preselected envelope; a chroma threshold circuit coupled to an output of said envelope detector for providing a control signal; and a controllable amplifier having an input coupled to said receiving means for receiving said chroma signal, and a control input coupled to said chroma threshold circuit for receiving said control signal, an output of said controllable amplifier providing a modified chroma signal.

A second aspect of the invention includes an arrangement for increasing saturation of colors in a color television signal while maintaining the fleshtone colors at a same level, said arrangement comprising means for receiving color difference signals; means for selecting the color difference signals not relating to fleshtones; means for rectifying said selected color difference signals to obtain the positive-going portions of said selected color difference signals; and means for adding, respectively, predetermined amount of said positive-going portions of said selected color difference signals to the respective selected color difference signals. This second aspect of the invention also includes an arrangement for increasing saturation of colors in a color television signal while maintaining the fleshtone colors at a same level, said arrangement comprising means for receiving color difference signals; means for amplifying a selected one of said color difference signals to form an amplified signal; means for limiting said amplified signal to form a limited signal; means for half-wave rectifying said limited signal to form a rectified signal; means for boosting a predetermined portion of said rectified signal; means for adding said boosted rectified signal to said selected color difference signal; and means for adding respective predetermined portions of said rectified signal to the others of said color difference signals.

A third aspect of the invention includes an arrangement for increasing saturation of colors in a color television signal while maintaining fleshtone colors at a same level, said arrangement comprising means for receiving three separate color signals; means for subtracting one of said separate color signals from each of the other two of said color signals forming a first and a second difference signal; means for multiplying said first difference signal by said second difference signal forming a product signal; means for amplifying and limiting said product signal forming a limited signal; means for separately amplifying said limited signal at a different gain factor for each of said three color signals thereby forming three separate color amplification factors; and means for multiplying said three separate color signals by said three separate color amplification factors, respectively.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
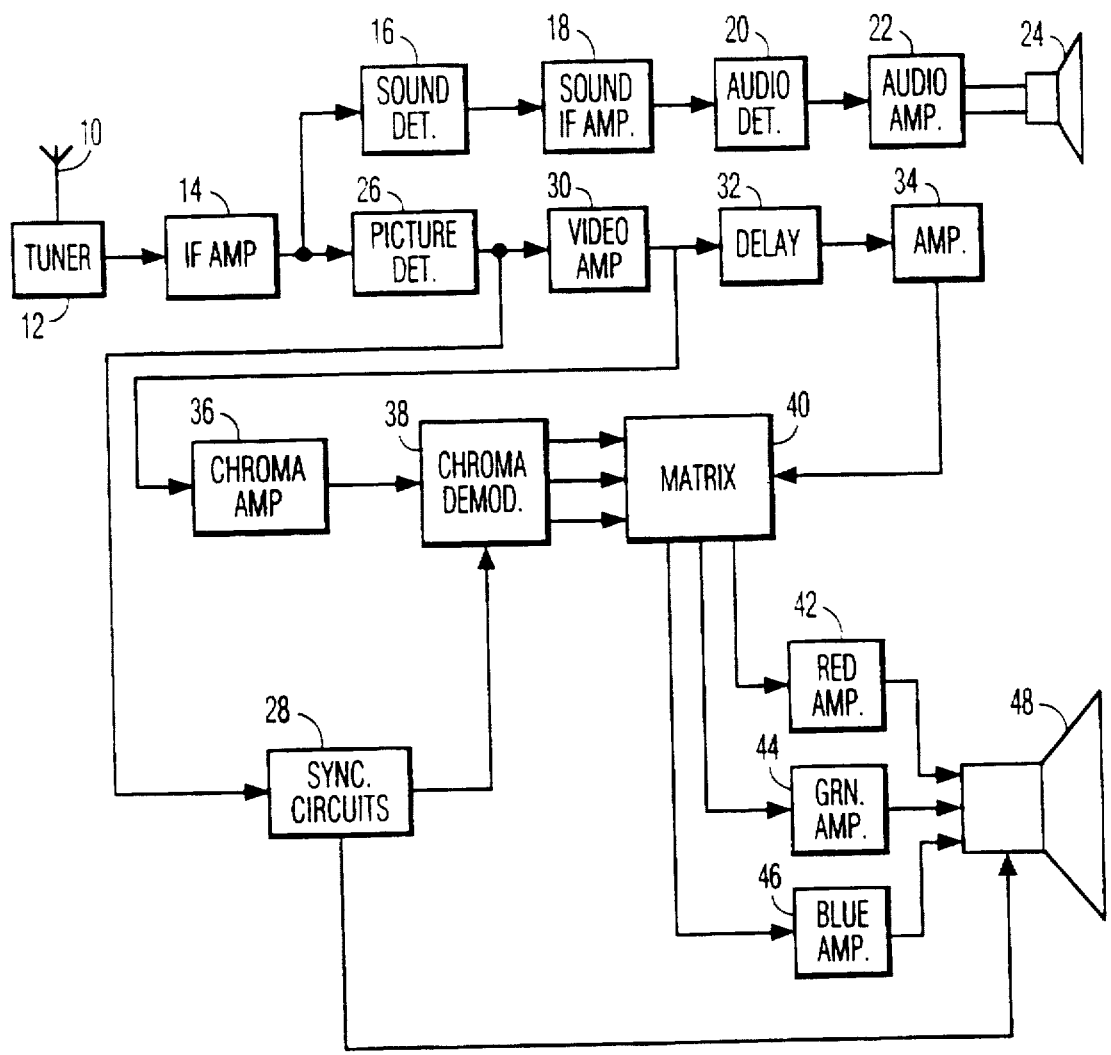
FIG. 1 shows a block diagram of a typical color television receiver.

FIG. 1 shows a block diagram of a typical color television receiver. An antenna 10 applies television signals to tuner 12 which selects one of the television signals and applies it to an intermediate frequency (IF) amplifier 14 which converts the television signal to an intermediate frequency signal. This signal is then applied to a sound detector 16 for detecting the sound portion of the television signal. A sound IF amplifier 18 amplifies the IF sound signal which is then applied to an audio detector 20 which converts the IF sound signal to an audio signal. An audio amplifier 22 amplifies the audio signal and applies it to a speaker 24.

The output from the IF amplifier 14 is also applied to a picture detector 26 for detecting the video portion of the television signal. An output from the picture detector 26 is applied to sync. circuits 28 for generating horizontal and vertical synchronizing signals and for generating other oscillator signals for use in the television receiver.

The output from the picture detector 26 is also applied to a video amplifier 30 which applies its output to a delay circuit 32 and then to a luminance signal amplifier 34.

The output from the video amplifier 30 is also applied to a chrominance signal (chroma) amplifier 36. The amplified chrominance signal is then applied to a chroma demodulator 38 for forming color difference signals (B-Y, R-Y, G-Y). These color difference signals are then applied, in addition to the luminance signal at the output of luminance signal amplifier 34, to a matrix circuit 40 which forms the color signals Red (R), Green (G) and Blue (B). These color signals are applied, respectively, to red, green and blue signal amplifiers 42, 44 and 46 which apply their output signals to the respective color guns of a cathode ray tube 48. The horizontal and vertical synchronizing signals from the sync. circuits 28 are applied to deflection coils on the cathode ray tube 48.

With the appropriate adjustments made, the above color television receiver produces images on the cathode ray tube 48 which closely relate to the colors of the original images. However, as noted above, it has been found that consumers are dissatisfied with such a display; the feeling being that the images are "drab". Instead, consumers desire "better than life colors", that is, more saturated colors, with the exception of fleshtones.

It has been found that it is possible to achieve this by operating on the color portion of the television signal in one of three separate areas, i.e., in a first aspect of the invention, the chrominance signal at the output of the chroma amplifier 36, in a second aspect of the invention, the color difference signals at the outputs of the chroma demodulator 38, or in a third aspect of the invention, the color signals at the outputs of the matrix circuit 40.

Figure 2:
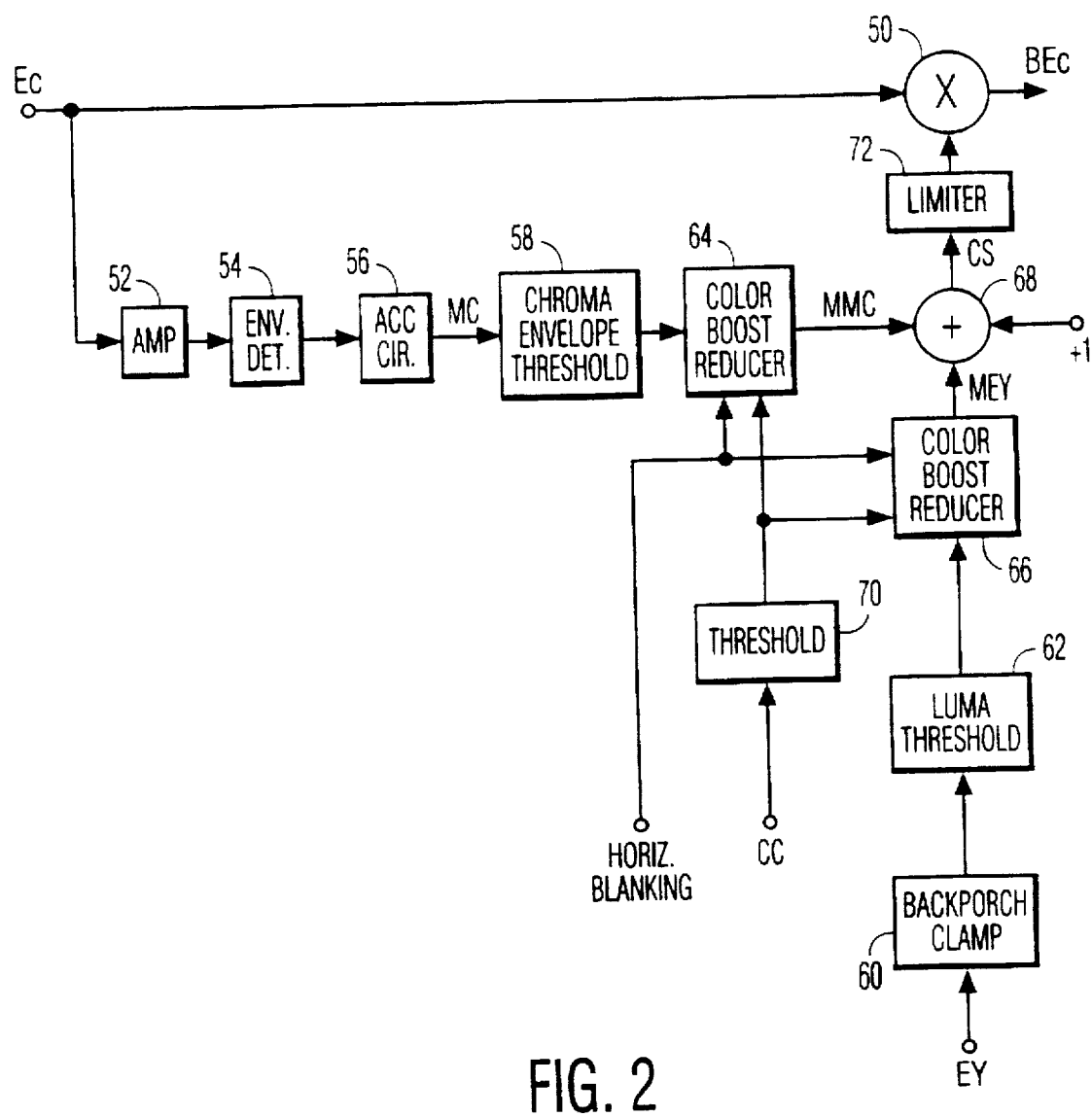
FIG. 2 shows a block diagram of a first embodiment of the invention operating on a chrominance signal.

In accordance with the first aspect of the invention, FIG. 2 shows a block diagram of a vivid color booster operating on the chrominance signal. The chrominance signal (Ec) is applied, on the one hand, to a first input of a multiplier 50, and, on the other hand, to an amplifier 52. The output from the amplifier 52 is applied to an envelope detector 54. The output from the envelope detector 54 is applied to an automatic color control (ACC) circuit 56 which acts as an automatic gain control of the chrominance signal to regulate its magnitude.

The output (MC) from the ACC circuit 56, representing the magnitude of the chrominance signal, is applied to a chroma threshold circuit 58 which is set for the threshold value (MCf) of fleshtone. Experimentation has found that this value should be 0.179. The resultant modified magnitude of the chrominance signal (MMC) is used to develop a control signal (CS) that is used to multiply the original chrominance signal. The control signal is composed of two parts: the portion of the amplified magnitude of the chrominance signal that exceeds the threshold level (MMC) plus a modified luminance signal (MEY). This modified luminance signal is acquired by applying the luminance signal (EY) originating, for example, from luminance signal amplifier 34, to a back porch clamp 60 which applies its output to a luminance threshold circuit 62 which has a threshold of, for example, EYf=0.29. The purpose of this is to boost low luminance colors. Respective color boost reduction circuits 64 and 66 receive the output signals from the chroma threshold circuit 58 and the luminance threshold circuit 62, respectively. The outputs from these color boost reduction circuits 64 and 66 are applied to first and second inputs of an adder circuit 68 which receives a constant (unity) value at a third input, so that when the chrominance magnitude is below its threshold and the luminance signal is above its threshold, the control signal is at unity. In order that the arrangement is cognizant of the user's desires, a color control voltage (CC), which may vary from 1.82 to 6.54 volts and is controllable by the user, is applied, through a threshold circuit 70 to respective control inputs of the color boost reduction circuits 64 and 66. The effect of the color control setting is introduced as a gain reduction when the color control voltage exceeds a given threshold, for example, 3.80 volts, representing a nominal control setting. The gain reduction is fashioned so that the MMC and MEY signals go to zero at the maximum color control voltage. Finally, the color boost reduction circuits are triggered by the horizontal blanking signal received from the sync. circuits 28 in order to delete the burst signal from the MMC signal as well as to delete any sync signal from the MEY signal. Thus, during the horizontal blanking period, the control signal CS is at unity.

The output from the adder circuit 68 forms the control signal CS which, after being limited to, for example, 1.25 in limiter 72, is applied to a second input of the multiplier 50. The output from the multiplier 50 then carries the boosted chrominance signal BEc.

Equations representing the above are as follows:

$$MEY=(EYf-EY) \times 1 \times \{1-(CC-CCf)/2.74\};$$

for $EY \geq EYf$; 0 elsewhere & for $CC \geq CCf$;

$$MMC=(MC-MCf) \times 2.56 \times \{1-(CC-CCf)/2.74\}$$

for $MC \geq MCf$; 0 elsewhere & for $CC-CCf$ $CS=1+MMC+MEY$.

While this first embodiment boosted all colors above the threshold determined for fleshtones, it was found that it would be desirable to boost other colors outside of the region of fleshtones that are below the determined threshold.

Figure 3:
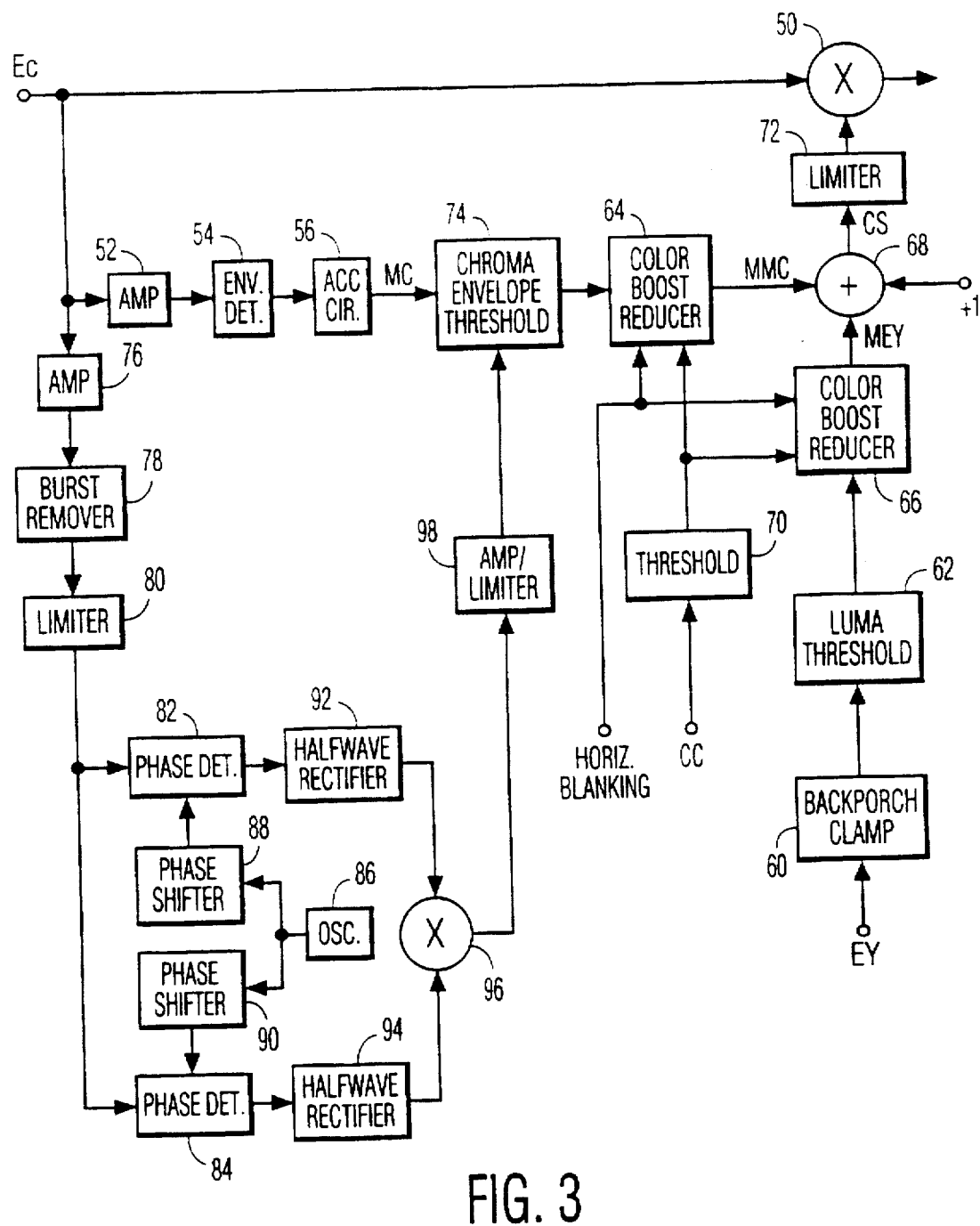
FIG. 3 shows a block diagram of a second embodiment of the invention operating on a chrominance signal.

The second embodiment of FIG. 3 boosts all colors except for chrominance signals that fall within a relatively narrow phase range centered around that representative of typical fleshtones. In this embodiment, both the magnitude threshold and phase region of the chrominance signal are used. However, instead of a fixed threshold as in the first embodiment, a phase detection method is used to control a "dynamic" threshold. Chrominance signals of phase outside of the detection region are not subjected to a magnitude threshold and are therefore boosted. Chrominance signals that fall within the phase detection region are subjected to the magnitude threshold; those of magnitude less than fleshtones are not boosted, but those above are boosted. The supplemental boost of certain low level luminance colors and the reduction of color saturation boost, as a function of color control setting, are also included in this embodiment.

The second embodiment is substantially similar to the first embodiment with the exception that the fixed chroma threshold circuit 58 is replaced by a dynamic chroma threshold circuit 74 and a phase control circuit for developing a control signal for the dynamic chroma threshold circuit 74.

In particular, as shown in FIG. 3, the input chrominance signal is applied to an amplifier 76 after which the burst signal is removed in burst remover 78. The resulting signal is then limited in limiter 80 and is then applied to respective phase detectors 82 and 84 centered at 50° and 200°, respectively. The reason for two phase detectors is to provide flexibility in adjusting the range and center of the detection region. A single phase detector has a range of ±90 degrees. However, it is desired to have a range in the order of ±15 degrees. The method used is to separate the two phase detectors by 150 degrees such that the overlap between the detectors is 30 degrees and centered at the phase of typical fleshtones (approximately 124 to 127 degrees). To this end, an oscillator 86 having an oscillation frequency of 3.58 MHZ (the chrominance subcarrier frequency) applies its output signal to two phase shifters 88 and 90 which shift the oscillator signal at phases centered at 50° and 200°. The outputs from these phase shifters 88 and 90 are applied to respective control inputs of the phase detectors 82 and 84. The outputs from the phase detectors 82 and 84 are rectified in half-wave rectifiers 92 and 94, respectively, and are multiplied in multiplier 96. After being amplified and limited in amplifier/limiter 98, the resultant control signal is applied to a control input of the dynamic chroma threshold circuit 74.

In this second embodiment, the dynamic chroma thresholding results in all colors at all saturation levels are boosted except for those in the phase region around fleshtones and below the threshold level.

In each of the first and second embodiments of the invention, it was found, through consumer testing, that the arrangements boosted red too much and did not enhance green sufficiently. Further, it was determined that the contribution from the luminance signal was negligible and hence, unnecessary.

Figure 4:
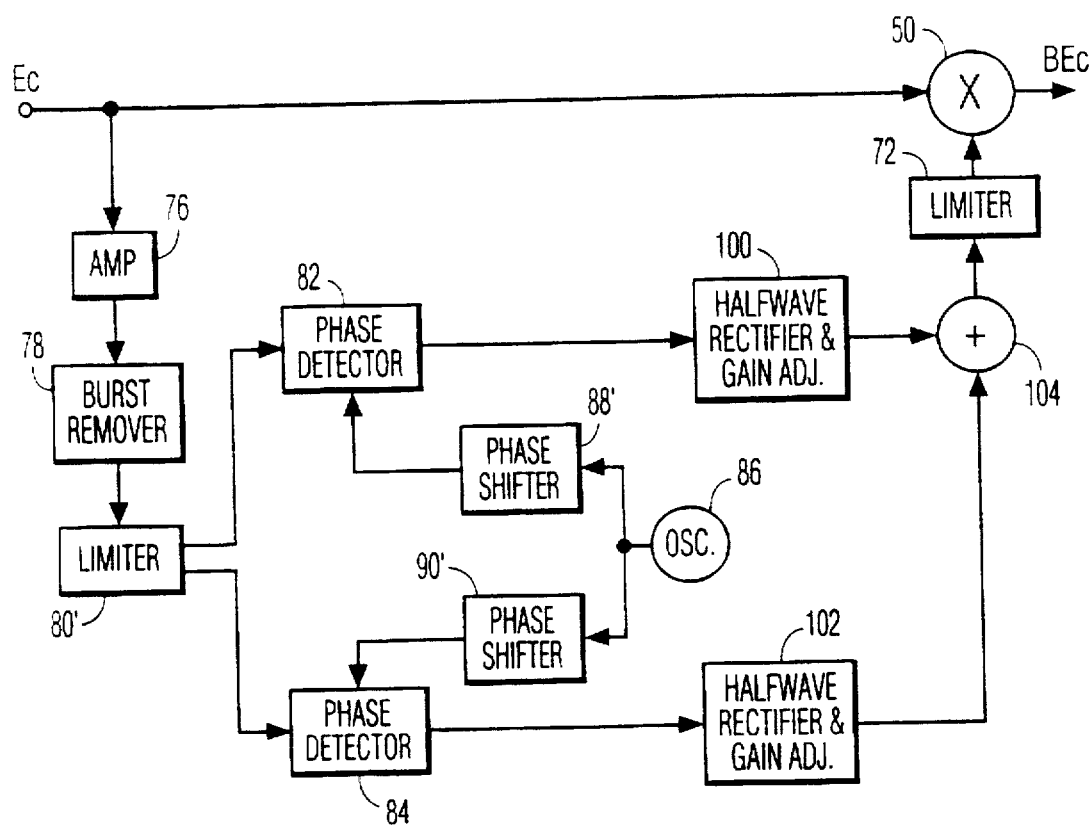
FIG. 4 shows a block diagram of a third embodiment of the invention also operating on a chrominance signal.

FIG. 4 shows a third embodiment of the invention which is related to the second embodiment, and which is the preferred embodiment of the first aspect of the invention. In particular, instead of a chroma threshold circuit, the subject embodiment uses the phase control circuit to generate the gain factor for modifying the original chrominance signal. The limiter 80 of FIG. 3 is replaced by a limiter 80' which generates a signal C and its complement –C which are applied, respectively, to the phase detectors 82 and 84. Again, the oscillator 86 generates an oscillation signal at 3.58 MHZ which is applied to phase shifters 88' and 90' which are now centered on the phases +230° and 0°. The outputs from the phase detectors 82 and 84 are applied to half-wave rectifiers/gain adjusters 100 and 102. The outputs from the rectifier/adjusters 100 and 102 are then added in adder 104, the output therefrom being limited in limiter 72 prior to being applied to multiplier 50.

This third embodiment shows no boost for colors of RED, FLESH and RED-YELLOW, while all of the other colors are boosted beyond their original values.

As noted above, the subject invention may be applied to the color difference signals at the output of the chroma demodulator 38 in a second aspect of the invention.

Figure 5A:
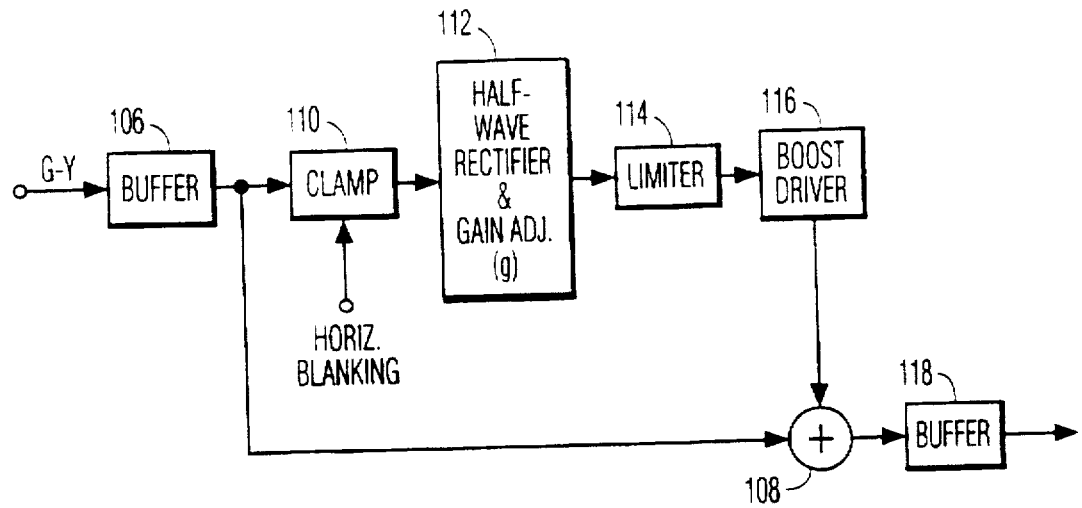
FIGS. 5A and 5B show block diagrams of a fourth embodiment of the invention operating separately in an additive manner on two color difference signals.
Figure 5B:
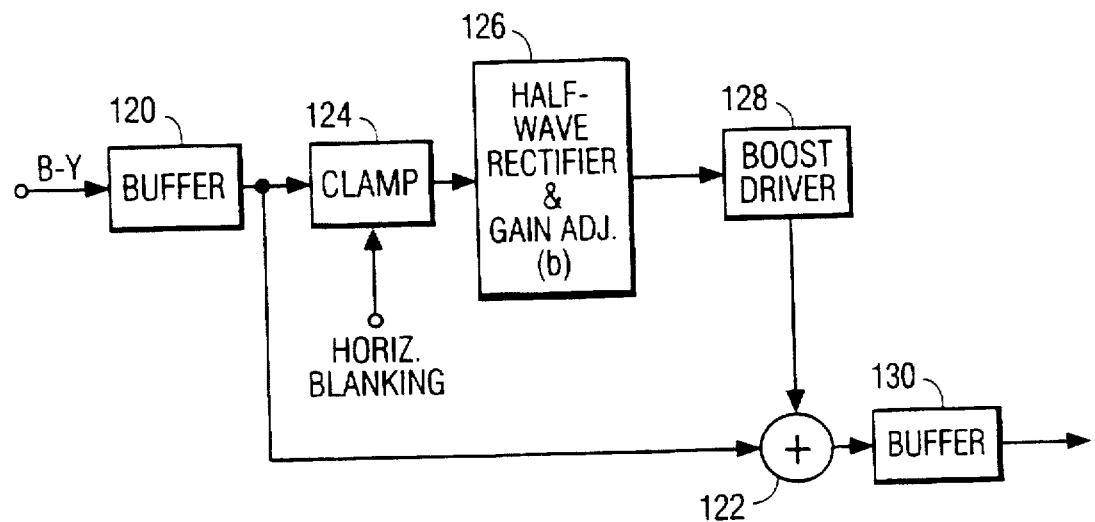

As shown in FIGS. 5A and 5B, the fourth embodiment of the invention operates independently on the (G-Y) and (B-Y) color difference signals. In particular in FIG. 5A, the (G-Y) color difference signal is applied to a buffer circuit 106 which applies its output to a first input of an adder circuit 108 and to a clamp circuit 110 which receives the horizontal blanking signal from the sync. circuits 28. The output from the clamp circuit 110 is applied to a half-wave rectifier/gain adjuster 112, having a gain factor of (g), whose output is limited in limiter 114, amplified in boost driver 116, and then applied to a second input of the adder circuit 108. The output of the adder circuit 108 is buffered in buffer circuit 118.

Similarly, the (B-Y) color difference signal is applied to buffer circuit 120 which applies its output to a first input of an adder circuit 122 and to a clamp circuit 124 which also receives the horizontal blanking signal from the sync. circuits 28. The output of the clamp circuit 124 is applied to a half-wave rectifier/gain adjuster 126, having a gain factor of (b), whose output is amplified in boost driver 128 and then applied to a second input of the adder circuit 122, the output of the adder circuit 122 being buffered in buffer circuit 130.

A result of the half-wave rectification of the (G-Y) and (B-Y) signals is the effective boost of only the positive-going (G-Y) and (B-Y) signals to selectively enhance greens and blues. However, it was noted that this embodiment results in a certain amount of shifting of colors on each side of green and blue toward these primary colors.

Figure 6:
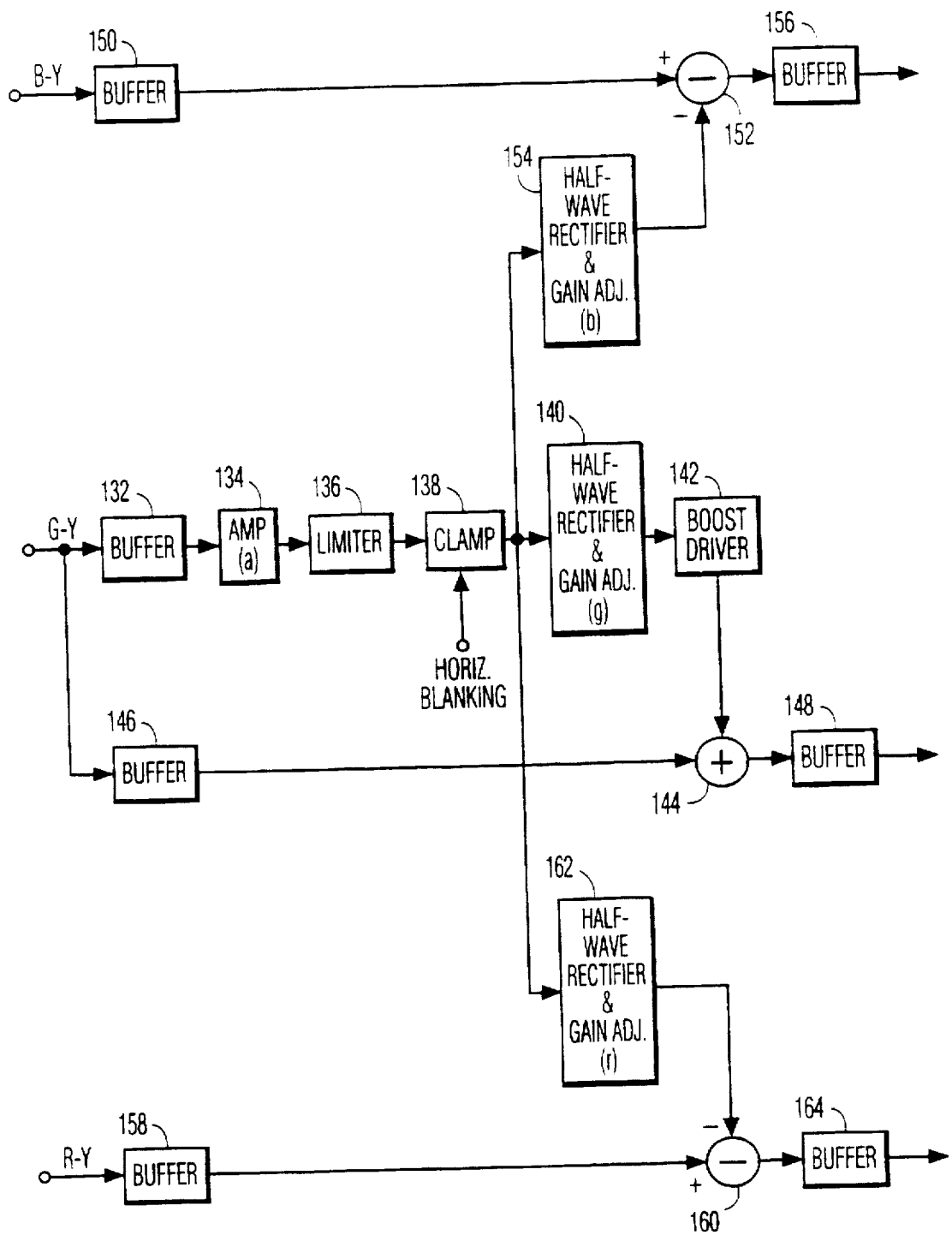
FIG. 6 shows a block diagram of a fifth embodiment of the invention operating, interrelatedly in an additive manner, on the three color difference signals based on one of the color difference signals.

In a fifth embodiment of the invention, the G-Y signal is amplified, limited and half-wave rectified. A certain amount of this signal is then added to the unmodified G-Y signal. In addition, a certain amount of the rectified G-Y signal is subtracted from the R-Y and B-Y signals. This effectively enhances only greens and colors on either side of green. The limiting action restricts the amount of "hue" pulling. In particular, as shown in FIG. 6, the G-Y signal is applied to a buffer 132 and is them amplified in amplifier 134 having a gain factor of (a), limited in limiter 136 and clamped in clamp 138 which is gated by the horizontal blanking signal received from sync. circuits 28. The output from the clamp 138 is then applied to a half-wave rectifier/gain adjuster 140, having a gain factor of (g), which applies its output via a boost driver circuit 142 to a first input of an adder circuit 144. The G-Y signal is also applied via a second buffer 146 to a second input of the adder circuit 144. An output from the adder circuit 144 is applied to a buffer 148 which provides the modified G-Y signal.

The B-Y signal is applied via a buffer 150 to a "+" input of a subtracter circuit 152. The output from the clamp 138 is then applied to a half-wave rectifier/gain adjuster 154, having a gain factor of (b), whose output is applied to a "–" input of subtracter circuit 152. The output from the subtracter circuit 152 is applied to a buffer 156 which provides the modified B-Y signal.

Similarly, the R-Y signal is applied via a buffer 158 to a "+" input of a subtracter circuit 160. The output from the clamp 138 is then applied to a half-wave rectifier/gain adjuster 162, having a gain factor of (r), whose output is applied to a "−" input of the subtracter circuit 160. The output from the subtracter circuit 160 is applied to a buffer 164 which provides the modified R-Y signal.

Figure 7:
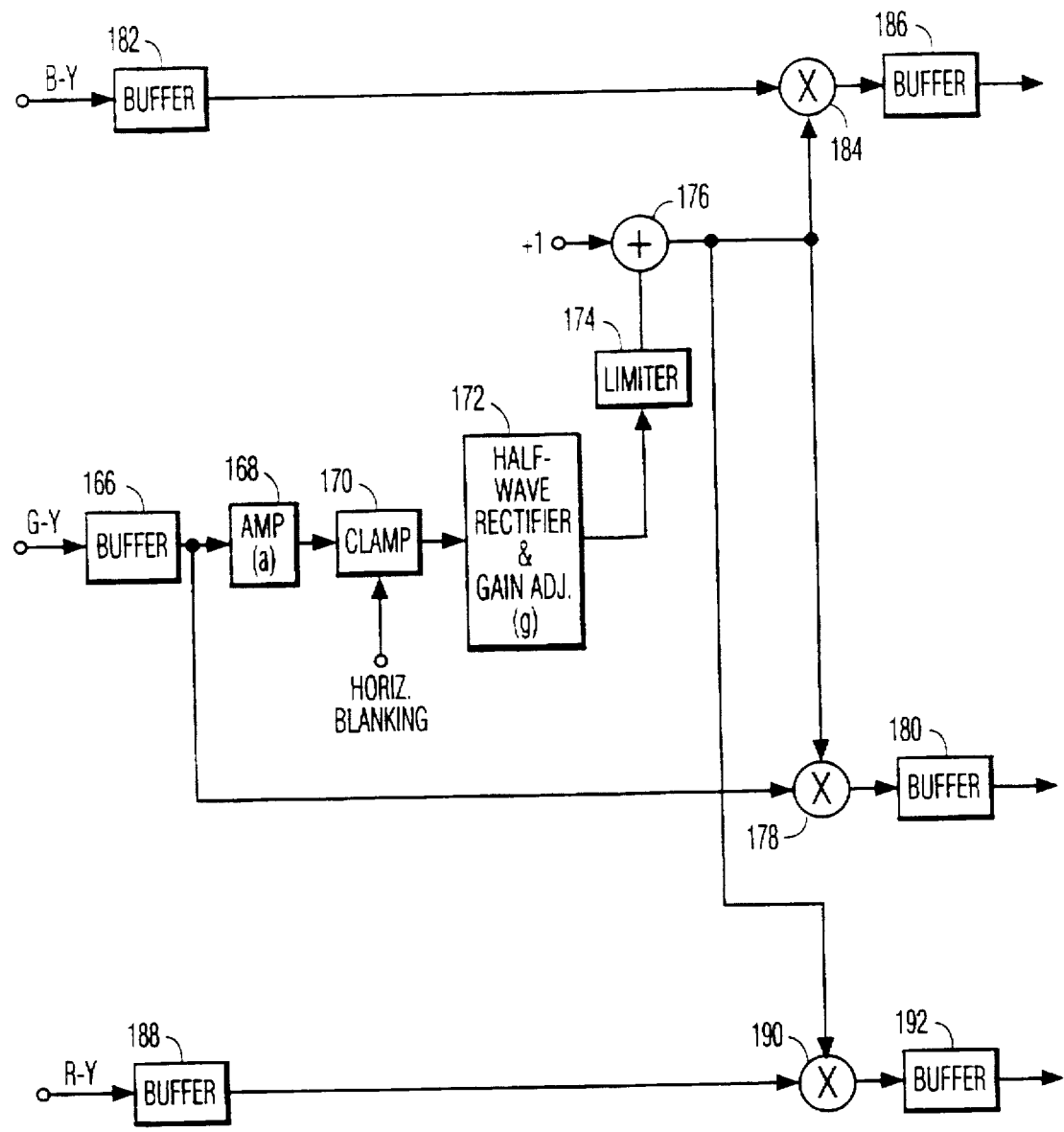
FIG. 7 shows a block diagram of a sixth embodiment of the invention, similar to the fifth embodiment, operating, interrelatedly in a multiplicative manner, on the three color difference signals based on one of the color difference signals.

As noted above, both the fourth and fifth embodiments of the invention experience some "hue" pulling, although to a much less extent in the fifth embodiment. This is due to the additive nature of the correction. A sixth embodiment of the invention circumvents the "pulling" effect by half-wave rectifying the G-Y signal and then using this rectified signal as a multiplying factor for each of the color difference signals. In particular, as shown in FIG. 7, the G-Y signal is buffered in buffer 166, amplified in amplifier 168, having a gain factor of (a), and clamped in clamp 170 which is gated by the horizontal blanking signal from sync. circuits 28. The output from the clamp 170 is then applied to half-wave rectifier/gain adjuster 172, having a gain factor of (g), whose output is applied via a limiter 174 to a first input of an adder circuit 176 which receives a unity signal at its second input. The output from the adder circuit 176 is applied to a first input of a multiplier 178. The output from the buffer 166 is also applied to a second input of the multiplier 178. The output from the multiplier 178 is applied to a buffer 180 which provides the modified G-Y signal.

The B-Y signal is buffered in buffer 182 and the output of the buffer 182 is applied to a first input of multiplier 184 which receives the output from adder circuit 176 at its second input. The output from the multiplier 184 is applied to a buffer 186 which provides the modified B-Y signal. Similarly, the R-Y signal is buffered in buffer 188 and the output from buffer 188 is applied to a first input of multiplier 190 which receives the output from 176 at its second input. The output from multiplier 190 is applied to buffer 192 which provides the modified R-Y signal.

This sixth embodiment achieves a color saturation boost, without hue pulling for colors in the yellow, green and cyan regions.

A seventh embodiment of the invention represents a preferred embodiment of the second aspect of the invention. In this seventh embodiment, the multiplying factor is comprised of the sum of half-wave rectified G-Y and B-Y signals. The effect is to also boost color saturation of blues and magentas. The effect is similar to the third embodiment of the invention.

Figure 8:
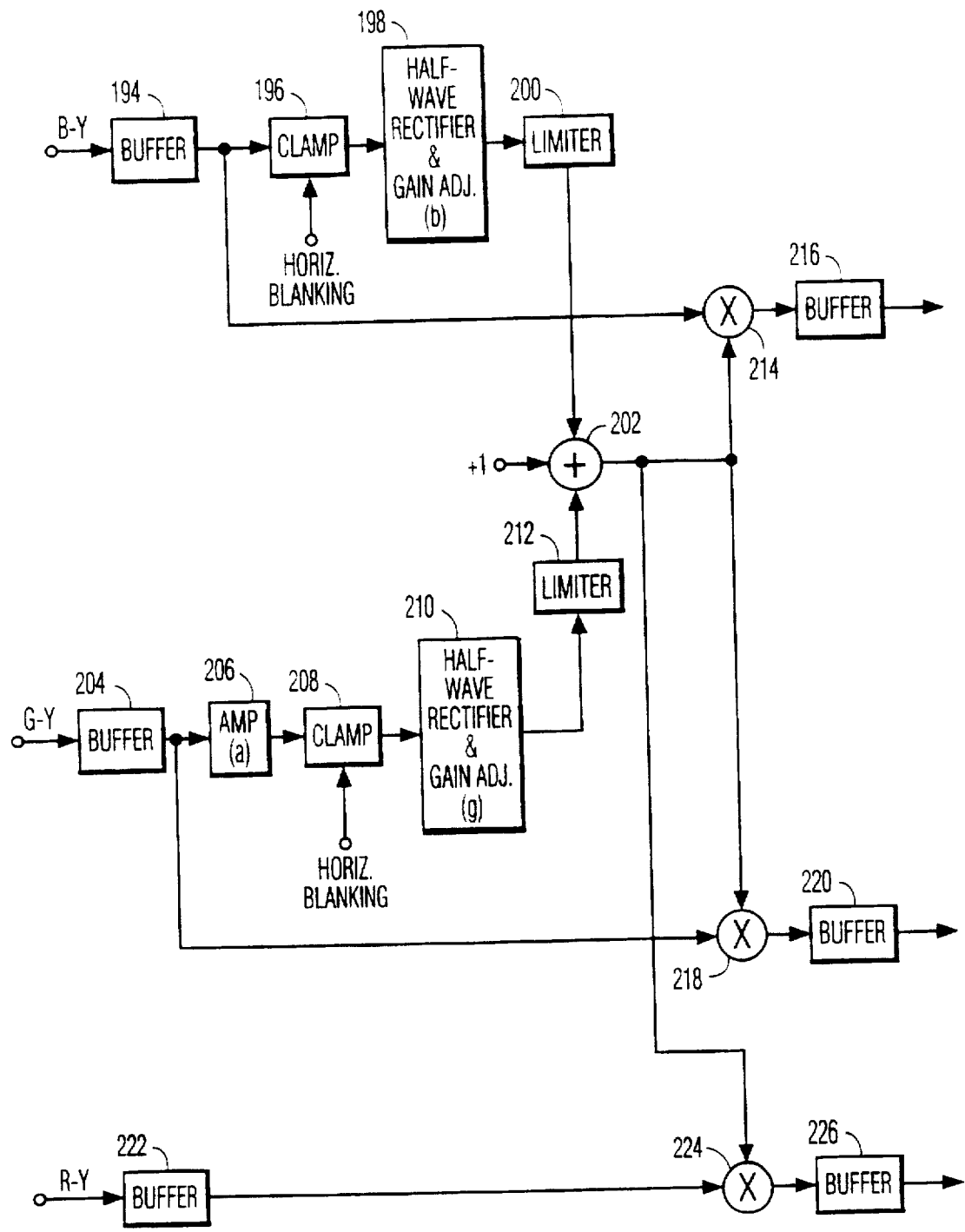
FIG. 8 shows a block diagram of a seventh embodiment of the invention, similar to the sixth embodiment, operating, interrelatedly in a multiplicative manner, on the three color difference signals based on two of the color difference signals.

In particular, as shown in FIG. 8, the B-Y signal is applied to a buffer 194 and is then clamped in clamp 196 which is gated by the horizontal blanking signal from sync. circuits 28. The output from the clamp 196 is then applied to half-wave rectifier/gain adjuster 198, having a gain factor of (b). The output from half-wave rectifier/gain adjuster 198 is applied via a limiter 200 to a first input of an adder 202. The G-Y signal is applied to a buffer 204, amplified in amplifier 206, having a gain factor of (a), and then clamped in clamp 208. The output from the clamp 208 is then applied to half-wave rectifier/gain adjuster 210, having a gain factor of (g), the output therefrom being limited in limiter 212 and then applied to a second input of adder 202. A third input of adder 202 receives a unity value.

The output from adder 202 is applied to a first input of multiplier 214 which receives the output from buffer 194 at its second input. The output from the multiplier 214 is buffered in buffer 216 which provides the modified B-Y signal. Similarly, the output from the adder 202 is applied to a first input of multiplier 218 which receives the output from buffer 204 at its second input. The output from multiplier 218 is buffered in buffer 220 which provides the modified G-Y signal. Finally, the R-Y signal is buffered in buffer 222 and is then applied to a first input of a multiplier 224 which receives the output from adder 202 at its second input. The output from multiplier 224 is buffered in buffer 226 which provides the modified R-Y signal.

An eighth embodiment of the invention develops correction signals for the color difference signals by using the negative going portions of the B-Y and R-Y signals. Only chrominance signals of phases in the III quadrant of the chrominance signal plane are affected in the augmentation process. This includes green colors but not yellows or cyans since these fall outside of the III quadrant.

Figure 9:
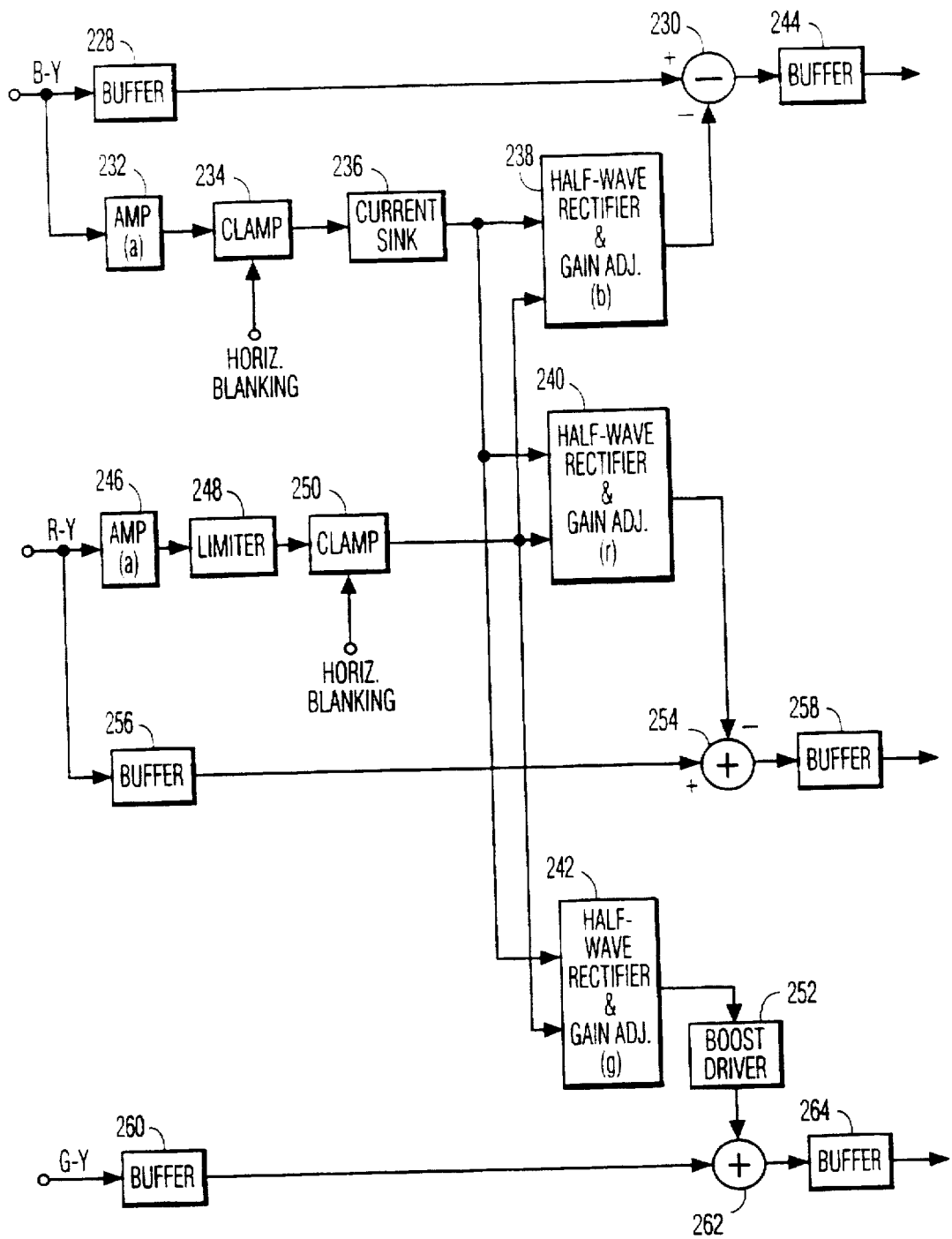
FIG. 9 shows a block diagram of an eighth embodiment of the invention, similar to the sixth embodiment.

As shown in FIG. 9, the B-Y signal is applied to a buffer 228 whose output is applied to a first input (+) of a subtractor 230. The B-Y signal is also applied to an amplifier 232, having a gain factor of (a), clamped in a clamp 234, gated by the horizontal blanking signal from the sync. circuits 28, and applied to a current sink 236. The output from the current sink 236 is applied to first inputs of first, second and third half-wave rectifier/gain adjusters 238, 240 and 242. The output of first half-wave rectifier/gain adjuster 238, having a gain factor of (b), is applied to a second input (−) of subtractor 230, the output therefrom being buffered in buffer 244 which provides the modified B-Y signal.

The R-Y signal is applied to an amplifier 246, having a gain factor of (a), limited in a limiter 248 and then clamped in clamp 250. The output from clamp 250 is then applied to second inputs of half-wave rectifier/gain adjusters 238, 240 and 242. The output from half-wave rectifier/gain adjuster 240, having a gain factor of (r), is applied to a first input (−) of subtractor 254. The R-Y signal is also buffered in buffer 256 and is then applied to a second input (+) of subtractor 254. An output from subtractor 254 is applied to a buffer 258 which provides the modified R-Y signal.

Finally, the G-Y signal is applied to a buffer 260 and then to a first input of an adder 262. The output from half-wave rectifier/gain adjuster 242, having a gain factor of (g), is applied to a boost driver 252 which applies its output to a second input of adder 262. The output from the adder 262 is then buffered in buffer 264 which provides the modified G-Y signal.

The ninth embodiment, which exemplifies the third aspect of the invention, shows augmentation of red (R), green (G) and blue (B) color signals to achieve similar results as in the eighth embodiment. Whenever the G signal is simultaneously greater than R and B signals, the G signal is boosted a predetermined amount while both the R and B signals are reduced a predetermined amount. This effectively boosts colors in the green region.

Figure 10:
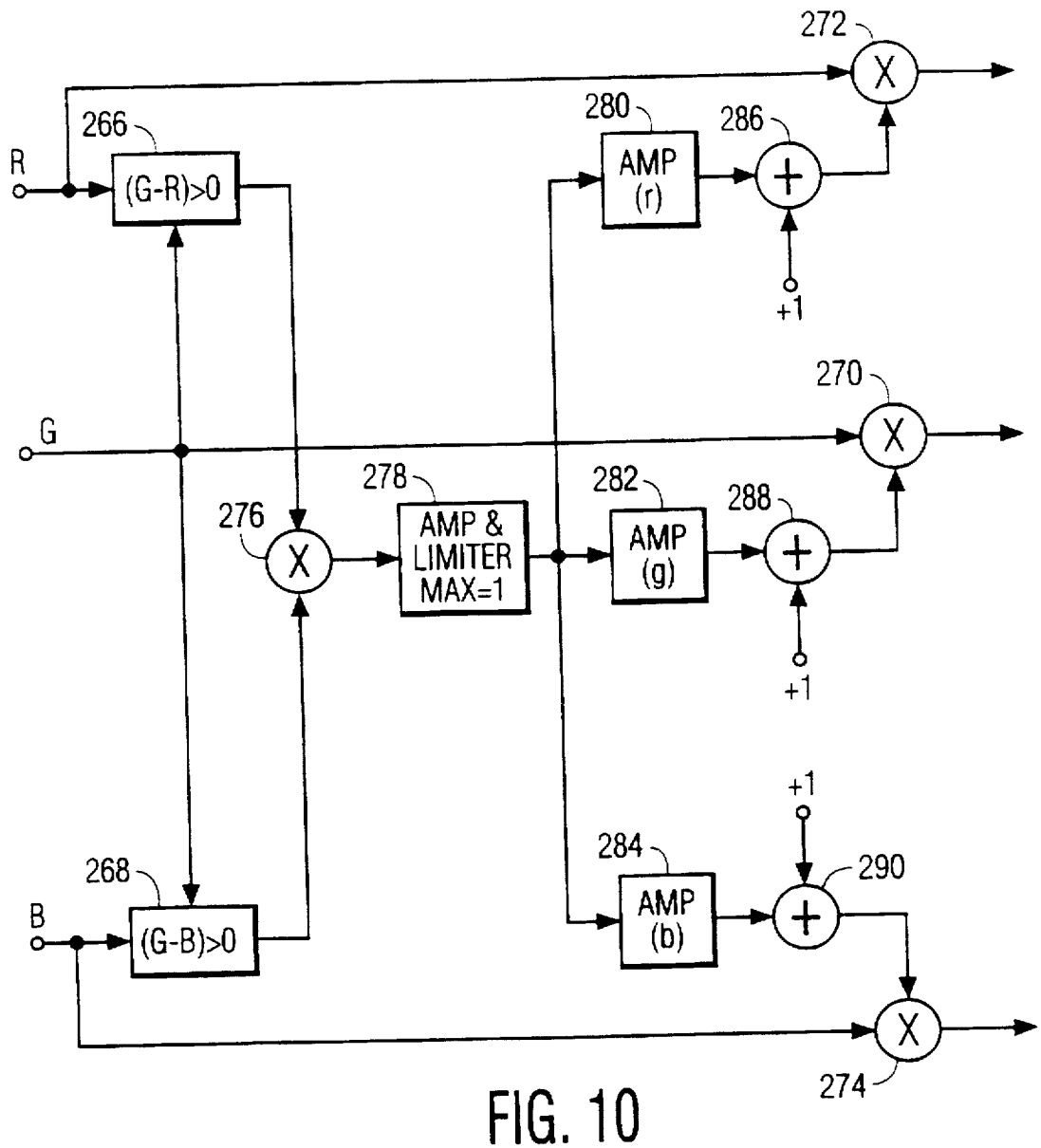
FIG. 10 shows a block diagram of a ninth embodiment of the invention operating, interrelatedly in a multiplicative manner, on the three color signals.

As shown in FIG. 10, the G signal is applied to the control inputs of a first and a second gate circuit 266 and 268, and also to the first input of a multiplier 270. The R signal is applied to the signal input of the first gate circuit 266 and to the first input of a multiplier 272, while the B signal is applied to the signal input of the second gate circuit 268 and to the first input of a multiplier 274. The outputs of the first and second gate circuits 266 and 268 are applied, respectively, to the first and second inputs of a multiplier 276. The output of the multiplier 276 is applied, via an amplifier/limiter circuit 278, having a limit value of 1, to the inputs of amplifiers 280, 282 and 284, having amplification factors of (r), (g) and (b), respectively. The output of amplifier 280 is applied to a first input of an adder 286 which receives a unity value at its second input. The output of adder 286 is coupled to the second input of multiplier 272, the output of which provides the modified R signal. Similarly, the output of amplifier 282 is applied to a first input of an adder 288 which receives a unity value at its second input. The output of adder 288 is coupled to the second input of multiplier 270, the output of which provides the modified G signal. Finally, the output of amplifier 284 is applied to a first input of an adder 290 which receives a unity value at its second input. The output of adder 290 is coupled to the second input of multiplier 274, the output of which provides the modified B signal.

Figure 11:
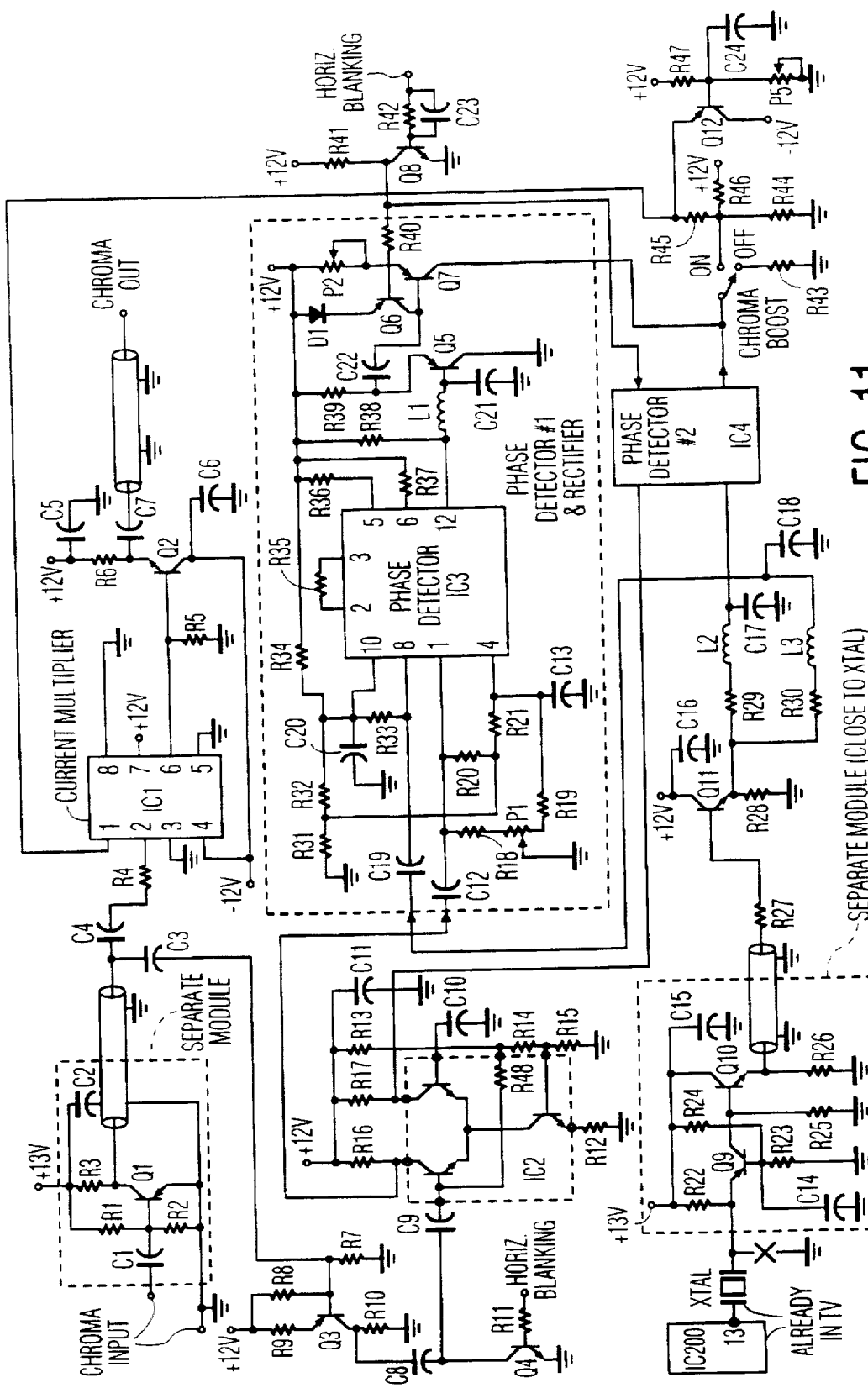
FIG. 11 is a schematic diagram of an implementation of the third embodiment of the invention of FIG. 4.
Figure 12:
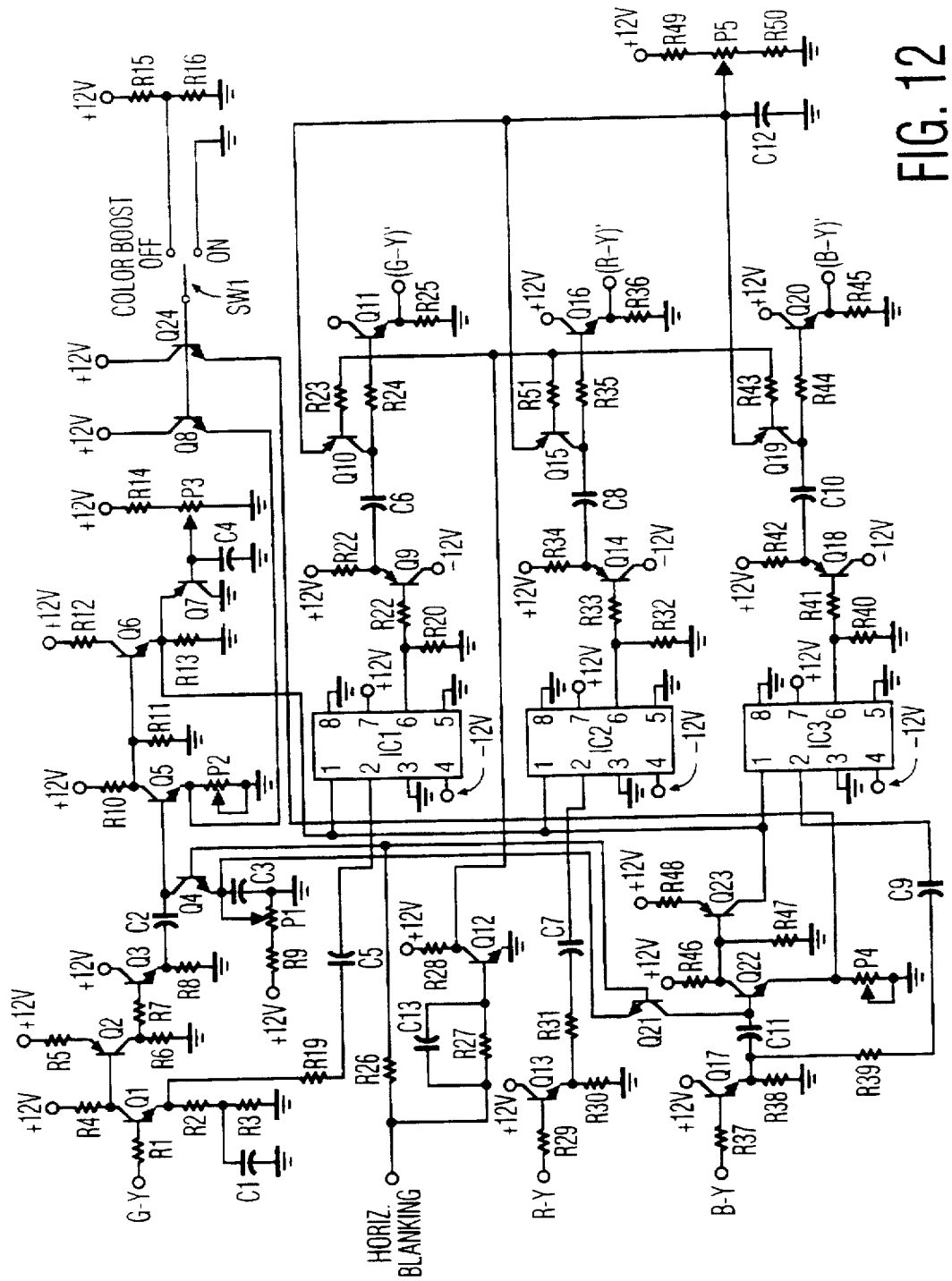
FIG. 12 is a schematic diagram of an implementation of the seventh embodiment of the invention of FIG. 8.

FIGS. 11 and 12 show practical implementations, in the form of schematic diagrams, of the third and seventh embodiments of the invention, representing the preferred embodiments of the first and second aspects of the invention.

As shown in FIG. 11, the chrominance signal path, just following the comb filter circuit in a television receiver, is broken and a buffer stage, including transistor Q1, is mounted close to the input break point. A shielded cable is used to bring the chrominance signal to a module containing the color boost circuitry. This chrominance signal is fed to a gain control IC (current multiplier IC1), buffered by transistor Q2, and returned to the television receiver chassis via a shielded cable to the output break point. The chrominance signal is amplified by transistor Q3, and the burst is removed by turn-on of transistor Q4 during the horizontal blanking period. The signal is amplitude-limited by the differential amplifier pair, which form the integrated circuit IC2 and may be realized as CA3054, and then fed into the two phase detectors IC3 and IC4, which may be realized as MC1496P.

The phase detectors are also fed reference oscillator signals at 3.58 MHZ. The reference oscillator signals are developed from that used in the television receiver for the color demodulators therein. In particular, the ground end of the 3.58 MHZ crystal in the television receiver is lifted (see FIG. 11) and fed to a common base amplifier, transistor Q9. The amplified oscillator signal is buffered in transistor Q10 and then fed to a coaxial cable that interacts with the color boost circuitry.

The signal is again buffered in transistor Q11 to provide a low impedance drive for the phase shifters. The design of the subject invention is such that the amplitudes of these phase-shifted signals are essentially equal and at about 360 mV peak-to-peak. These two reference signals are fed to the two phase detectors at a 0 degree phase with respect to the chrominance signal at pin 1 of IC4, and at a +230 degree phase with respect to the chrominance signal at pin 1 of IC3.

Each phase detector has a null adjustment to minimize the amount of 3.58 MHZ at their outputs (pins 12). Harmonic content is reduced by the filters at the bases of transistor Q5 and Q13 (transistors Q13, Q14 and Q15 being in the phase detector #2). The transistors Q5 and Q13 provide low impedance drives for the following clamps, transistors Q6 and Q14, respectively. These clamps allow half-wave rectification of the phase detector output signals in transistors Q7 and Q15 so as to restrict the signals to the desired polarity. The resulting collector currents in transistors Q7 and Q15 are summed in a common 1 k ohm load. Gain adjustment for each of the rectified signals is provided by potentiometers P2 and P4.

When the ON-OFF switch SW1 is in the ON position, the collector currents flow into a 1 k ohm load, raising the voltage above the 1 VDC developed by the 11 k ohm and 1 k ohm divider from the 12 VDC supply. The control voltage is fed to pin 1 of IC1, but it is limited to a maximum value by transistor Q12. Adjustment of the limit value can be made by potentiometer P5. With the switch SW1 in the OFF position, the control voltage remains at 1 VDC, and this provides unity gain for IC1. With the circuit values shown below, the gain for integrated circuit IC1 is in direct proportion to the voltage on pin 1 (i.e., gain=1.5 for 1.5 VDC).

The value for the components in FIG. 11 are shown in TABLE I:

TABLE I

| CAPACITORS | | | |
|---|---|---|---|
| C1, C2, C3, C4 | | C17 | 390 pF |
| C7, C14, C15, C16 | .01 µF | C18 | 270 pF |
| C5, C6, C11 | 100 µF | C21 | 82 pF |
| C8, C9, C10, C12 | | C23 | 22 pF |
| C13, C19, C20, C22 | 0.1 µF | C24 | 4.7 µF |
| RESISTORS | | | |
| R1, R46 | 11 k ohms | R14 | 1.1 k ohms |
| R2, R25, R42 | 47 k ohms | R15 | 390 ohms |
| R3 | 560 ohms | R16, R17 | 510 ohms |
| R4 | 910 ohms | R22 | 18 k ohms |
| R5, R10, R31, R39 | | R23 | 6.8 k ohms |
| R43, R44, R45, R48 | 1 k ohms | R24 | 2.2 k ohms |
| R6 | 4.7 k ohms | R26 | 3.3 k ohms |
| R7 | 51 k ohms | R27, R33 | 100 ohms |
| R8 | 680 ohms | R28 | 470 ohms |
| R9 | 68 ohms | R29, R30 | 51 ohms |
| R11, R18, R19 | | R32 | 820 ohms |
| R36, R41, R47 | 10 k ohms | R34 | 1.3 k ohms |
| R12, R20, R21, R35 | 510 ohms | R37, R38 | 2.7 k ohms |
| R13 | 1.5 k ohms | R40 | 15 k ohms |
| POTENTIOMETERS | | INDUCTORS | |
| P1, (P3) | 50 k ohms | L1 = CAMBION 558-3387-22 | |
| P2, (P4) | 5 k ohms | L2/L3 = CAMBION 558-3387-07 | |
| P5 | 2 k ohms | | |
| | | INTEGRATED CIRCUITS | |
| TRANSISTORS | | IC1 | EL2082 |
| NPN = 2N3904 PNP = 2N3906 | | IC2 | CA3054 |
| DIODES | | IC3/IC4 | MC1496P |
| D1 = 1N914 | | (IC200 | Color demodulator) |

As shown in FIG. 12, a gain control signal is provided for each of the color difference signals, and this gain control signal is developed from a combination of rectified (positive-going) G-Y and B-Y color difference signals. The gain control means is provided by the current multipliers IC1, IC2 and IC3. The current gain of these devices (pins 2–6) is in direct proportion to the voltage on pin 1. For 1 volt on pin 1, the current gain is unity, and for 2 Volts on pin 1, the current gain is 2 times. With the circuit values given in FIG. 12, the peak-to-peak color difference signal voltages at the output of the multipliers (pins 6) are the same as at the inputs to the system at the bases of transistors Q1, Q13 and Q17 when the control voltage is 1 Volt on pins 1 of the multipliers. The control voltage is developed across the resistor R13 at the collector of transistor Q6.

Taking the signal path for the R-Y color difference signal, it is first buffered by the emitter follower transistor Q13, and an AC current is developed going into pin 2 of IC2 that is 1 mA/Volt. This is so because the input impedance at pin 2 is approximately 90 ohms, and the voltage at the emitter of transistor Q13 sees 910+90=1000 ohms. The current out of pin 6 develops a voltage across resistor R32 at the base of transistor Q14. The R-Y signal is then buffered by transistor Q14 which provides a low impedance drive source for the following clamp circuit consisting of the coupling capacitor C8 and the clamp transistor Q15. The purpose of the clamp circuit is to re-establish the same DC level, during the horizontal blanking period, at the output of transistor Q16 as at the input to transistor Q13. The clamp transistor Q15 is turned-on hard into saturation by a negative-going blanking pulse supplied by transistor Q12. The clamp level is established via the adjustable DC voltage source by the potentiometer P5. The paths for the G-Y and B-Y signals are similar to that described for the R-Y signal except that they also branch to circuitry for development of the gain control voltage.

The G-Y signal is amplified by transistor Q1, inverted by transistor Q2, and is of the same phase at the emitter of transistor Q3 as that at the input. Transistor Q3 provides a low impedance source for the following clamp circuit consisting of the coupling capacitor C2 and the clamp transistor Q4. The transistor Q4 is turned-on into hard saturation by a positive-going horizontal blanking signal and clamps the signal at the base of transistor Q5, during the blanking period, to a DC level set by the potentiometer P1. This clamp level is also available for the B-Y clamp transistor Q21. The purpose of these clamp transistors is to set the turn-on point for transistors Q5 and Q22 so that only the positive-going portions of the G-Y and B-Y signals cause these transistors to conduct (i.e., rectification). The G-Y and B-Y rectified signals are then amplified by transistors Q5 and Q22, respectively, by amounts that can be adjusted by the potentiometers P2 and P4. The negative-going signal at the collector of transistor Q22 causes transistor Q23 to conduct into the common load resistor R13 at the collector of transistor Q6. The DC bias for transistor Q23 is set by the voltage divider at its base, consisting of resistors R46 and R47, so that it is just at the point of turn-on when transistor Q22 is not conducting. Thus, transistor Q23 conducts only when transistor Q22 conducts to provide a contribution of rectified B-Y signal to the common load. The bias for transistor Q6, however, is different from that of transistor Q23, in that transistor Q6 provides a DC collector current of 1 mA as determined by the voltage divider at its base, consisting of resistors R10 and R11. This provides the 1 Volt steady-state control voltage for the multipliers. Whenever the G-Y and/or B-Y signals are negative-going, the control voltage remains at 1 Volt. When the G-Y and/or B-Y signals are positive-going, the control voltage increases above 1 Volt and the gain of all three multipliers increase, accordingly.

The transistor Q7 provides limiting on how far the control voltage goes above 1 Volt. The potentiometer P3 sets the limit point so that when the voltage at the emitter of transistor Q7 goes more than 0.7 Volts above its base voltage, transistor Q7 conducts and clamps the control voltage to that level. The combination of transistors Q8 and Q24 and the switch SW1 provides a means to disable the color boost action, for example, for demonstration purposes. With the switch SW1 in the OFF position, a back-bias voltage is applied to the emitters of transistors Q5 and Q22. This will render these transistors non-conducting so that the control voltage remains at 1 Volt. With the switch SW1 in the ON position, transistors Q8 and Q24 are non-conducting so that the back-bias for transistors Q5 and Q22 is removed.

The value for the components in FIG. 12 are shown in TABLE II:

TABLE II

CAPACITORS

| | | |
|---|---|---|
| C1, C2, C3, C4, C5, C6, C7, C8, C9, C10, C11, C12 | | 4.7 µF |
| C13 | | 22 pF |

RESISTORS

| | | | |
|---|---|---|---|
| R1, R7, R21, R24 | | R11 | 6.2 k ohms |
| R29, R33, R35, R37 | | R14 | 9.1 k ohms |
| R41, R44 | 390 ohms | R15 | 8.2 k ohms |

TABLE II-continued

| | | | |
|---|---|---|---|
| R2, R3 | 620 ohms | R16 | 3.9 k ohms |
| R4, R5, R6, R8, R10 | | R19, R39 | 910 ohms |
| R12, R13, R20, R22 | | R23, R26, R43, R51 | 15 k ohms |
| R25, R30, R32, R34 | | R27 | 47 k ohms |
| R36, R38, R40, R42 | | R28 | 10 k ohms |
| R45, R46, R48 | 1 k ohms | R31 | 910 ohms |
| R9 | 11 k ohms | R47 | 21 k ohms |
| | | R49, R50 | 5.1 k ohms |

TRANSISTORS

| | |
|---|---|
| NPN = 2N3904 | PNP = 2N3906 |

INTEGRATED CIRCUITS

| | |
|---|---|
| IC1, IC2, IC3 | EL2082 |

POTENTIOMETERS

| | |
|---|---|
| P1 | 1 k ohms |
| P2, P3, P4 | 5 k ohms |
| P5 | 2 k ohms |

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. An arrangement for increasing saturation of colors in a color television signal while maintaining fleshtone colors at a same level, said arrangement comprising:

means for detecting color signals in a color television signal;

means for discerning fleshtone color signals in said detected color signals;

means for measuring signal levels of said detected color signals other than said discerned fleshtone color signals; and means for increasing the signal levels of said detected color signals other than said discerned fleshtone color signals in dependence on at least one of said measured signal levels.

2. An arrangement as claimed in claim 1, characterized in that said means for increasing the signal levels comprises:

means for forming a correction signal based on at least one of said measured signal levels; and means for adding said correction signal to said detected color signals other than said discerned fleshtone color signals.

3. An arrangement as claimed in claim 1, characterized in that said means for increasing the signal levels comprises:

means for forming a plurality of correction signals based, respectively, on said measured signal levels; and means for adding said plurality of correction signals to said respective detected color signals other than said discerned fleshtone color signals.

4. An arrangement as claimed in claim 1, characterized in that said means for increasing the signal levels comprises:

means for forming a gain factor based on at least one of said measured signal levels; and means for amplifying said detected color signals other than said discerned fleshtone color signals by said gain factor.

5. An arrangement as claimed in claim 1, characterized in that said means for increasing the signal levels comprises:

means for forming a plurality of gain factors based. respectively, on said measured signal levels; and means for amplifying said detected color signals other than said discerned fleshtone color signals, by said gain factors, respectively.

6. An arrangement for increasing saturation of colors in a color television signal while maintaining fleshtone colors at a same level, said arrangement comprising:

means for receiving a chroma signal;

an envelope detector coupled to said receiving means for detecting signal levels outside a preselected envelope;

a chroma threshold circuit coupled to an output of said envelope detector for providing a control signal; and a controllable amplifier having an input coupled to said receiving means for receiving said chroma signal, and a control input coupled to said chroma threshold circuit for receiving said control signal, an output of said controllable amplifier providing a modified chroma signal.

7. An arrangement as claimed in claim 6, characterized in that said arrangement further comprises:

a luminance threshold circuit to which a luminance signal, related to said chroma signal, is applied; and a summing circuit having a first input coupled to the output of said chroma threshold circuit, a second input coupled to an output of said luminance threshold circuit, a third input for receiving a predetermined constant value, and an output coupled to the control input of said controllable amplifier.

8. An arrangement as claimed in claim 6, characterized in that said chroma threshold circuit is dynamically adjustable and includes a control input, and said arrangement further comprises:

a limiter coupled to said receiving means for limiting said chroma signal; and a fleshtone phase detector coupled to an output of said limiter, an output of said fleshtone phase detector providing a threshold control signal for the control input of said chroma threshold circuit.

9. An arrangement as claimed in claim 8, characterized in that said fleshtone phase detector comprises:

an oscillator;

a first phase shifter coupled to an output of said oscillator;

a second phase shifter also coupled to the output of said oscillator;

a first phase detector having a first input coupled to the output of said limiter and a second input coupled to an output of said first phase shifter;

a second phase detector having a first input also coupled to the output of said limiter and a second input coupled to an output of said second phase shifter;

a first half-wave rectifier coupled to an output of said first phase detector;

a second half-wave rectifier coupled to an output of said second phase detector;

a multiplier having a first input coupled to an output of said first half-wave rectifier and a second input coupled to an output of said second half-wave rectifier, and output of said multiplier being coupled to the control input of said chroma threshold circuit.

10. An arrangement as claimed in claim 9, characterized in that said arrangement further comprises:

an amplifier coupled to the output of said multiplier;

an adder having a first input coupled to an output of said amplifier, and a second input coupled to receive a further predetermined constant value; and a further multiplier having a first input coupled to an output of said adder, and a second input coupled to the output of said chroma threshold circuit, an output of said further multiplier being coupled to the control input of said controllable amplifier.

11. An arrangement for increasing saturation of colors in a color television signal while maintaining fleshtone colors at a same level, said arrangement comprising:

means for receiving color difference signals;

means for selecting the color difference signals not relating to fleshtones;

means for rectifying said selected color difference signals to obtain the positive-going portions of said selected color difference signals; and means for adding, respectively, predetermined amount of said positive-going portions of said selected color difference signals to the respective selected color difference signals.

12. An arrangement as claimed in claim 11, wherein said color difference signals include G-Y, B-Y and R-Y color difference signals, and said selected color difference signals are the G-Y and the B-Y color difference signals.

13. An arrangement as claimed in claim 12, wherein said arrangement further comprises respective means for clamping said selected color difference signals, respective outputs of said clamping means being coupled to respective inputs of said rectifying means.

14. An arrangement as claimed in claim 12, wherein said arrangement further comprises means for limiting the positive-going portion of one of said selected color difference signals prior to being added in said adding means.

15. An arrangement as claimed in claim 14, wherein said one selected color difference signal is the G-Y color difference signal.

16. An arrangement for increasing saturation of colors in a color television signal while maintaining fleshtone colors at a same level, said arrangement comprising:

means for receiving color difference signals;

means for amplifying a selected one of said color difference signals to form an amplified signal;

means for limiting said amplified signal to form a limited signal;

means for half-wave rectifying said limited signal to form a rectified signal;

means for boosting a predetermined portion of said rectified signal;

means for adding said boosted rectified signal to said selected color difference signal; and means for adding respective predetermined portions of said rectified signal to the others of said color difference signals.

17. An arrangement for increasing saturation of colors in a color television signal while maintaining fleshtone colors at a same level, said arrangement comprising:

means for receiving three separate color signals;

means for subtracting one of said separate color signals from each of the other two of said color signals forming a first and a second difference signal;

means for multiplying said first difference signal by said second difference signal forming a product signal;

means for amplifying and limiting said product signal forming a limited signal;

means for separately amplifying said limited signal at a different gain factor for each of said three color signals thereby forming three separate color amplification factors; and means for multiplying said three separate color signals by said three separate color amplification factors, respectively.

18. An arrangement as claimed in claim 17, wherein said arrangement further comprises means for adding a predetermined value to each of said separate amplification factors.

19. An arrangement as claimed in claim 17, wherein said three separate color signals are a red, green and blue color signals.

20. An arrangement as claimed in claim 19, wherein said one of said separate color signals is said green signal.

* * * * *